(12) United States Patent
Lohmann

(10) Patent No.: US 7,641,020 B2
(45) Date of Patent: Jan. 5, 2010

(54) HAND RAIL FOR A WALKIE/RIDER TRUCK

(75) Inventor: Helmut Lohmann, Nartum-Gyhum (DE)

(73) Assignee: Jungheinrich Aktiengessellschaft, Hamburg (DE)

( * ) Notice: Subject to any disclaimer, the term of this patent is extended or adjusted under 35 U.S.C. 154(b) by 711 days.

(21) Appl. No.: 11/108,177

(22) Filed: Apr. 18, 2005

(65) Prior Publication Data

US 2006/0243517 A1    Nov. 2, 2006

(51) Int. Cl.
*B60K 26/00*    (2006.01)
(52) U.S. Cl. .................. 180/333; 180/19.1; 180/318
(58) Field of Classification Search ............. 180/318, 180/332–334, 19.1; 16/421, 430; 220/4.02; 74/551.9
See application file for complete search history.

(56) References Cited

U.S. PATENT DOCUMENTS

| | | | | |
|---|---|---|---|---|
| 4,306,782 A * | 12/1981 | Sobotta | ...................... | 353/119 |
| 4,444,284 A * | 4/1984 | Montemurro | ............... | 180/19.1 |
| 4,475,015 A * | 10/1984 | Kobayashi et al. | .......... | 200/5 R |
| 4,578,592 A * | 3/1986 | Nakazawa et al. | ......... | 307/10.1 |
| 4,599,920 A * | 7/1986 | Schmid | ......................... | 81/489 |
| 4,630,160 A * | 12/1986 | Murayama | ................... | 360/137 |
| 5,033,326 A * | 7/1991 | Powell et al. | ............... | 74/551.4 |
| 5,052,521 A * | 10/1991 | Wendt et al. | ................. | 187/202 |
| 5,190,267 A * | 3/1993 | Schmitt et al. | ................. | 256/59 |
| 5,245,144 A | 9/1993 | Stammen | ................. | 200/61.85 |
| 5,575,544 A * | 11/1996 | Hasegawa et al. | ............ | 312/7.1 |
| 5,595,159 A | 1/1997 | Huber et al. | ................. | 123/362 |
| 5,595,259 A * | 1/1997 | Gilliland et al. | ............. | 180/332 |
| 5,964,313 A * | 10/1999 | Guy | ............................. | 180/332 |
| 5,982,355 A * | 11/1999 | Jaeger et al. | ................. | 345/161 |
| 6,204,752 B1 * | 3/2001 | Kishimoto | ................... | 340/432 |
| 6,225,584 B1 * | 5/2001 | Ase et al. | ................. | 200/61.54 |
| 6,382,359 B1 * | 5/2002 | Lohmann | ..................... | 187/231 |
| 6,400,564 B1 * | 6/2002 | Nishimoto et al. | .......... | 361/683 |
| 6,464,025 B1 * | 10/2002 | Koeper et al. | .............. | 180/19.2 |
| 6,595,306 B2 * | 7/2003 | Trego et al. | ................ | 180/19.2 |
| 6,631,656 B2 * | 10/2003 | Ase et al. | .................... | 74/551.8 |
| 6,695,090 B2 * | 2/2004 | McAllister | ................... | 180/333 |
| 6,883,625 B2 * | 4/2005 | Trego et al. | ................ | 180/19.2 |
| 6,948,739 B2 * | 9/2005 | Gallagher et al. | ........... | 280/770 |
| 7,025,157 B2 * | 4/2006 | Lindsay et al. | ............. | 180/19.2 |
| 7,237,645 B2 * | 7/2007 | Lohmann et al. | ............ | 180/332 |
| 7,314,116 B2 * | 1/2008 | David et al. | ................. | 187/231 |
| 2002/0108801 A1 * | 8/2002 | McAllister | ................... | 180/333 |

(Continued)

FOREIGN PATENT DOCUMENTS

EP    4413631    10/1995

(Continued)

*Primary Examiner*—Paul N. Dickson
*Assistant Examiner*—Timothy Wilhelm
(74) *Attorney, Agent, or Firm*—Vidas, Arrett & Steinkraus, P.A.

(57) ABSTRACT

A hand rail for a walkie/rider truck and a conversely U-shaped hand rail has a grab bar, and a control housing being arranged on the grab bar which includes control elements for the lifting and lowering of the load carrying fork, for the horn and for a fast speed mode. The housing is located at the lower side of the grab bar such and the grab bar in the area of the control housing is formed such that the grab bar can be seized by the operator above the control housing in order to obtain a secure support and/or to actuate a control element.

15 Claims, 10 Drawing Sheets

U.S. PATENT DOCUMENTS

| | | | |
|---|---|---|---|
| 2003/0029648 A1* | 2/2003 | Trego et al. | 180/19.1 |
| 2004/0045132 A1* | 3/2004 | Chen | 16/430 |
| 2005/0039565 A1* | 2/2005 | Minkow et al. | 74/551.9 |
| 2005/0098375 A1* | 5/2005 | David et al. | 180/333 |

FOREIGN PATENT DOCUMENTS

| | | |
|---|---|---|
| EP | 1153815 | 11/2001 |

\* cited by examiner

HAND RAIL FOR A WALKIE/RIDER TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Such trucks have become known e.g. from U.S. Pat. No. 5,245,144, U.S. Pat. No. 6,595,306 or U.S. Pat. No. 5,964,313. On one end the body of the truck has a load carrying means, e.g. a load carrying fork. The truck body includes a lift drive for the load carrying fork and driving means for the truck. The steering of the truck takes place through a steering arm which is linked to the upper side of the truck body. With the free end the steering arm carries a head wherein various control elements for individual functions of the truck are arranged. At the front side the truck body is provided with a platform which can be used for the driver in order to ride with the truck. In this position the driver seizes a hand rail which is conversely U-shaped and mounted on the top of the truck body. The hand rail has two spaced approximately parallel vertical legs, and a hand rod or grab bar connected to the upper end of the vertical legs.

For the known walkie/rider trucks it has also become known to mount a control panel to the grab bar. From U.S. Pat. No. 6,595,306 it has become known to accommodate a plurality of control elements within a housing for such panel, preferably control elements for the lifting and lowering of the fork for the actuation of the horn and for the switching into a fast speed mode. The control elements or buttons are arranged in a control field which faces forwardly, i.e. towards the driver on the platform. From the prior art mentioned, it has further become known to arrange a further control element on the rear side of the control panel or housing e.g. for the actuation of the coast mode. In some uses the driver or operator prefers to let the truck freely roll further with small speed if he is still at a remote position. By this, the truck can be sent to a position where an operation is desired. Due to his experience, the operator can estimate how far the truck rolls on if he actuates this function at a predetermined speed.

The object of the invention is to provide a hand rail for a walkie/rider truck wherein the control panel is designed such or placed, respectively, that the operator can seize the grab bar of the hand rail at different positions also adjacent the control panel in order to actuate the control elements.

BRIEF SUMMARY OF THE INVENTION

In the hand rail according to the invention, the housing of the control panel is located at the lower side of the grab bar such and the grab bar in the area of the housing is formed such that the grab bar can be gripped or seized above the control panel or the control housing by the hand of the operator in order to actuate a control element and/or to hold fast.

The hand rail according to the invention allows a secure gripping position of the hand under different driving conditions i.e. travel in the direction of the steering arm, travel in the direction of the load carrying fork, actuation of the fast speed mode button, actuation of the horn, actuation of the control elements for lifting and lowering. With the hand rail according to the invention, the hand may slide along the grab bar from one end to the other without the necessity to release the grab bar.

In a particular preferred embodiment of the invention it is provided that the box-shaped control housing extends obliquely forwards. An inclined arrangement of the control housing is already known by the mentioned prior art. According to the invention the grab bar above the control housing has a bead-shaped thickening in cross-section which extends rewardly and which can be undergripped by the fingers of the hand seizing the grab bar. The bead allows that the finger may undergrip the bead while the thumb rests against the front side of the grab bar. The operator may hold fast on the grab bar if his hand is approximately in the centre of the grab bar above the control housing or box. In this gripping position an actuation of a control element can be carried out with a finger or the thumb.

In another embodiment of the invention the legs of the hand rail are bent forward with the upper ends thereof. With an inclined arrangement of the box-shaped control housing the bent portions of the legs include a right angle with the plane wherein the control housing extends with the plane having an angle of about 45° to 30° relative to a vertical plane.

In a further embodiment of the invention, the lower ends of the legs can be interconnected by a transverse web or rail which may be attached to the upper side of the truck body. Such an attachment can for example be carried out by threaded means. In this manner, a secure connection of the hand rail to the truck body is achieved. The upper side of the transverse web can be shaped as an elongated cup for the accommodation of articles. The hand rail including the transverse web can be made of metallic material in order to achieve a sufficient stability. Preferably, the metallic parts are coated with a plastic layer in order to avoid injuries. The cup is preferably made of soft plastic material in order to avoid a rattling of the accommodated articles during travel.

The bead-shaped thickening is also preferably of plastic material. It is preferably shaped to a tube of the grab bar. The bead can be integrally formed with the control housing which may include a recess for the receipt of a control box which is inserted into the box. The control or switch box with the control elements may be pre-manufactured completely with only control or signal cables lead out of the box which are accommodated by the hollow grab bar and at least one leg of the hand rail and introduced into the truck body.

Like the prior art in the invention, the control housing or the switch box has a control panel or field. In an embodiment of the invention the control elements for the lifting and lowering of the load carrying fork are on the left or right end of the control panel with the control elements being electrically or mechanically coupled. Thus, it depends upon the position of the operator on the platform or of the hand which grasps the grab bar whether the operator actuates the control elements on the left or the right side of the control panel if he wishes a lifting or lowering function. Control elements for the fast speed mode and the horn which are preferably positioned one above the other, can be arranged between the control elements on the left and the right end.

Alternatively, it is also possible to position a control element for the lifting and the lowering one above the other approximately in the centre of the control panel while at the left and the right end thereof control elements for the fast speed mode and the horn are arranged which preferably are electrically or mechanically coupled.

In the hand rail according to the invention at least one control element can be located on the rear side of the control housing or box, e.g. a control element for the coasting of the truck.

BRIEF DESCRIPTION OF THE SEVERAL VIEWS OF THE DRAWINGS

Embodiment examples of the invention are subsequently described along accompanying drawings wherein.

DETAILED DESCRIPTION OF THE INVENTION

Figure 1:
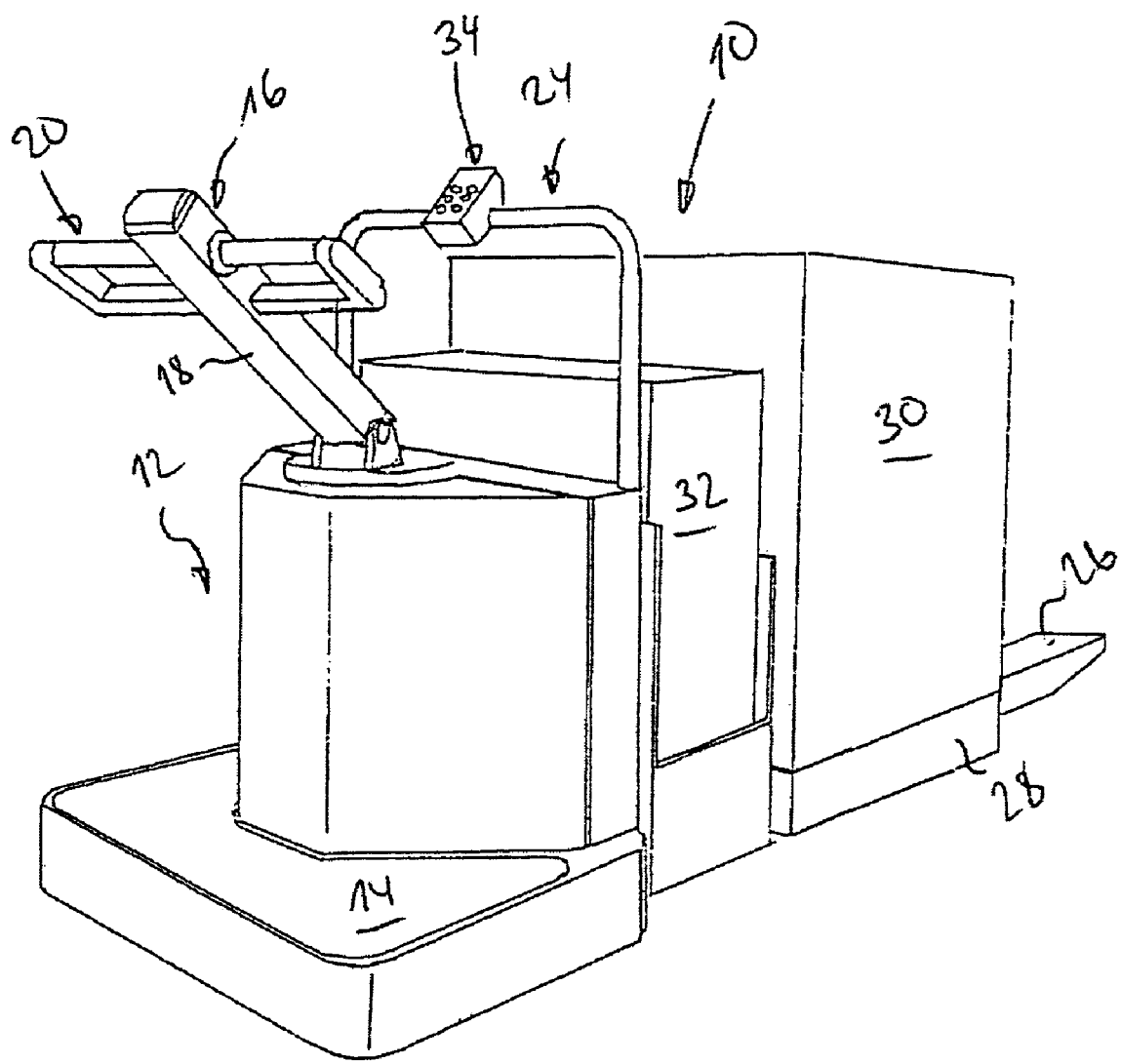
FIG. 1 shows perspectively a walkie/rider truck according to the prior art.

While this invention may be embodied in many different forms, there are described in detail herein a specific preferred embodiment of the invention. This description is an exemplification of the principles of the invention and is not intended to limit the invention to the particular embodiment illustrated In FIG. 1 a walkie/rider truck 10 is perspectively shown and for example has become known from U.S. Pat. No. 6,382,359 B1. It comprises a truck body 12 with a platform 14 mounted to the front side of the body for an operator. A steering arm 16 is linked to the upper side of the truck body 10. The steering arm has a rod 18 and a steering head 20. The rod 18 is pivotably supported on the upper side of body 12 about a horizontal axis. Furthermore, it can be rotated about a vertical axis for the steering operation of the steered wheel of truck 10, not shown. A conversely U-shaped hand rail 24 is mounted on the top of truck body 12. The operator may seize the hand rail if he stands on platform 14. He may stand on the left or the right side of platform 14 depending upon whether he is left or right handed. If he stands on the right side, he seizes with his right hand hand rail 24 and actuates the steering arm 16 with his left hand. If he stands on the left side of platform 14, it is vice versa.

At the rear side a load carrying means in form of a load carrying fork is located which can be recognized by a fork arm 26. It carries a pallet 28 upon which load 30 is placed. A battery 32 is located between the load carrying means and the truck body 12.

A control housing 34 is mounted to the grab bar of the hand rail 24 which includes individual control elements e.g. buttons to actuate a lifting or lowering of the load carrying fork, to actuate the horn or the coast mode. In the further figures it is exclusively referred to a hand rail modified with respect to that of FIG. 1 and with a modified control housing.

In FIGS. 2 and 3 and 6 to 19 a hand rail 40 is shown having a function similar to the function of hand rail 24 of FIG. 1. In the following the structure of hand rail 40 should be explained. It includes two parallel vertical spaced legs 42, 44 which taper upwards. As can be seen from FIGS. 12 and 13 or 18 and 19, respectively, an upper portion 46 of legs 42, 44 is bent forwardly i.e. towards the operator or the platform, respectively (see platform 14 in FIG. 1). The portion 46 extends proximately under an angle of 45° with respect to the vertical. The upper ends of portion 46 of both legs 42, 44 are interconnected by a grab bar 48. The lower ends of legs 42, 44 are interconnected by a transverse web or rail. An elongated cup 52 is formed at the upper side of transverse web 50.

Figure 3:
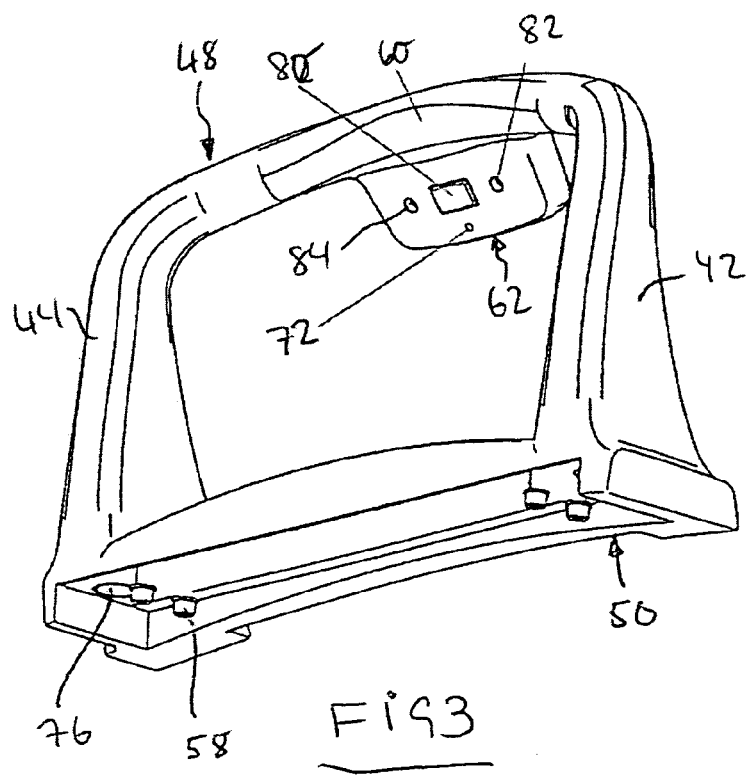
FIG. 3 shows the rear view of the hand rail of FIG. 2.
Figure 13:
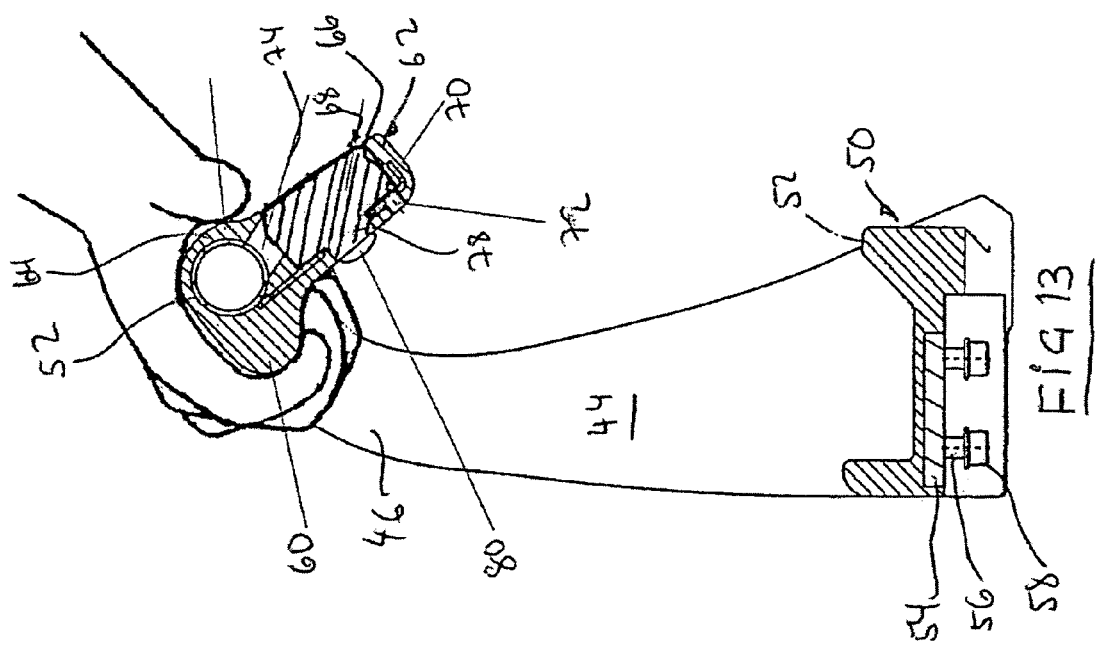
FIG. 13 shows a cross-section through the illustration of FIG. 10 along line 13-13.
Figure 12:
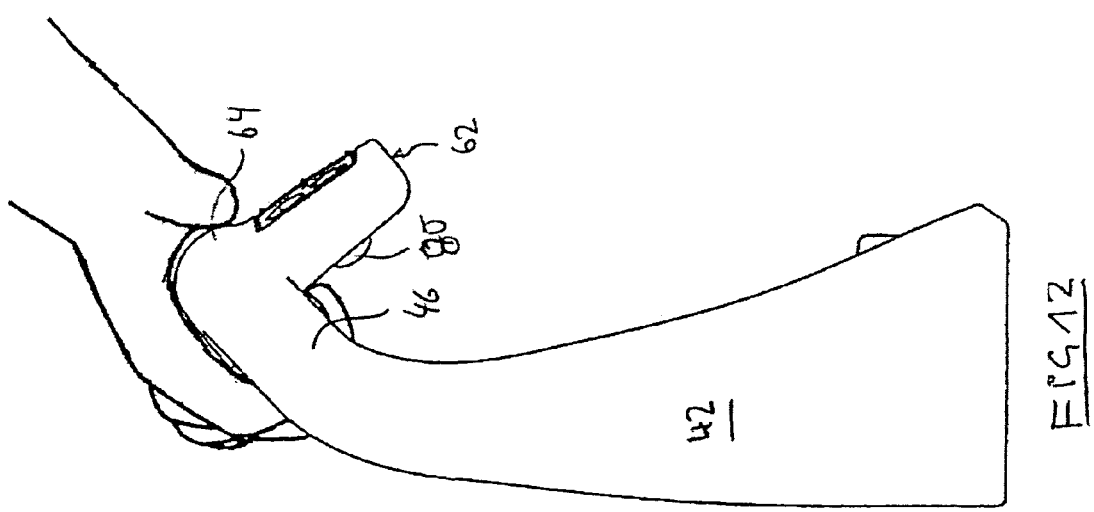
FIG. 12 shows a lateral view of the hand rail of FIG. 10 or 11.
Figure 19:
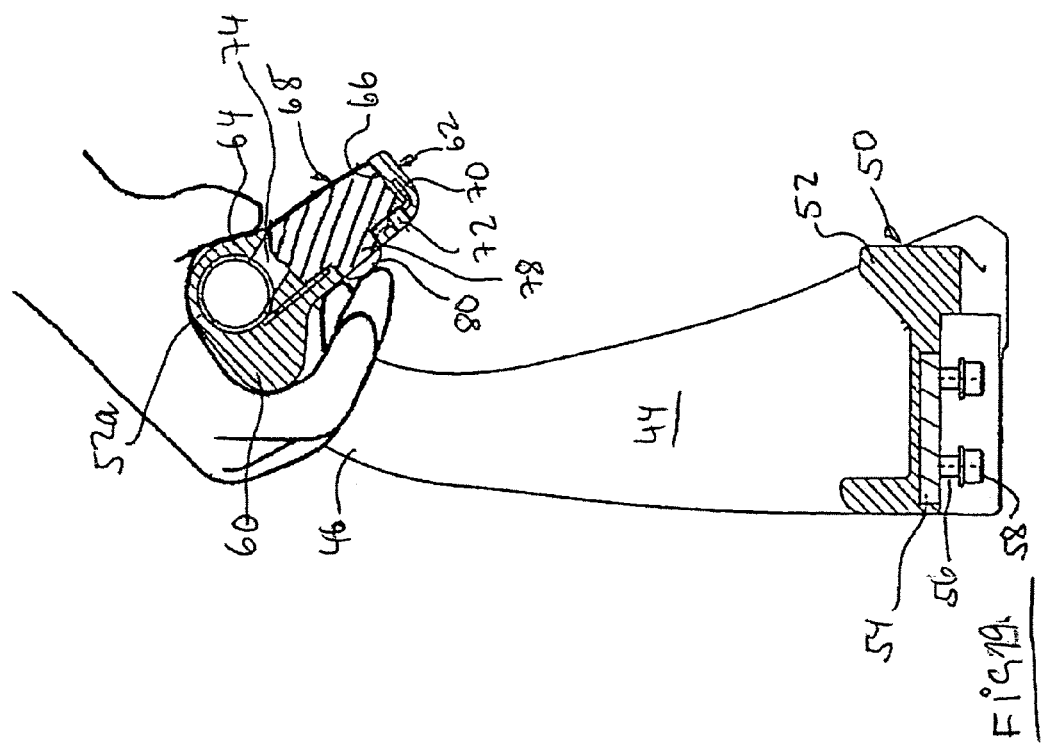
FIG. 18 shows the lateral view of the hand rail of FIG. 17 or 18 and FIG. 19 shows the cross-section through the illustration of FIG. 17 along line 19-19.
Figure 18:
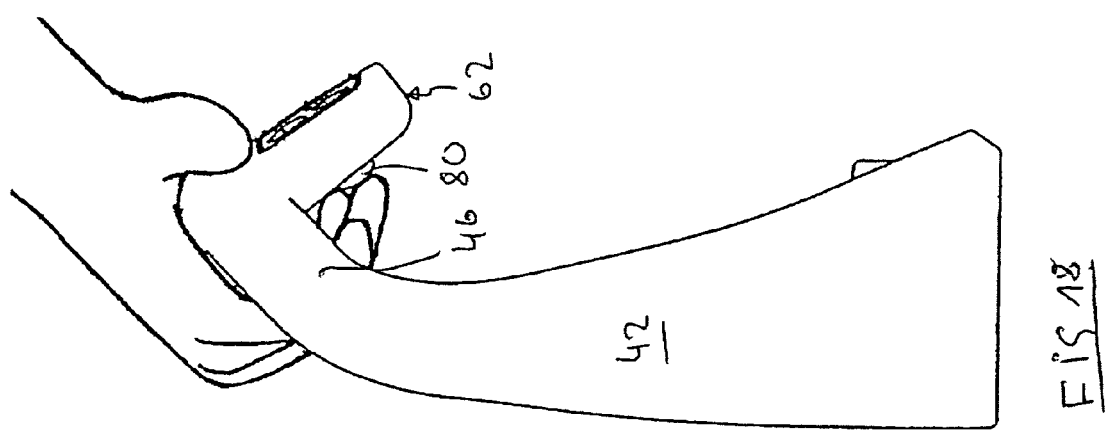

The structure of hand rail 40 can particularly be seen in FIGS. 12 and 13 and 18 and 19. In FIGS. 13 and 19 it can be seen that the grab bar has a grab tube 52a which at the ends is connected with metallic supports or tubular sections or the like which cannot be seen. These supports are connected with a rail 54 at the lower end which at the lower side has four threaded bolts 56 which co-act with nuts 58 in order to attach the transverse web 50 of hand rail 40 in a suitable manner to the upper side of the housing or the body of the truck. This attachment is not shown in detail. The described metallic parts of hand rail 40 are coated with plastic material with the coating of the rail 54 forming the cup. It is of relatively soft material in order to avoid a rattling of the articles in the cup 52 during travel. The coating of tube 52a is carried out in a specific manner. In the medium area of tube 52a an elongated bead 60 is shaped with in cross-section is obliquely and downwardly directed to the rear. It is positioned such that the finger of a hand (FIG. 13) which seizes the grab bar 40, may undergrip bead 60. A switch housing 62 is integrally formed with bead 60 which extends obliquely downwardly and forwardly approximately at an angle of 30° to the vertical. Opposite to bead 60 a somewhat smaller bead 64 is shaped to tube 52a which may be engaged by the thumb of the hand undergripping bead 60. The bead 64 is above the control housing 62. The control housing 62 is approximately box-shaped and has an inclined upwardly directed rectangular recess 66 which may accommodate a switch box 68 fitted to the recess. In the range of recess 66 of the control housing 62 the plastic material of the housing is enforced by a support sheet 70 L-shaped in cross-section. The support sheet 70 is welded to tube 52a with its upper edge. At 77 an opening for the draining of water at the lower side of the bottom of recess 66 is shown. A passage 74 in housing 62 interconnects recess 66 with tube 52a. The passage 74 serves for the accommodation of cables which are introduced into the interior of tube 52a and which are led through one of the legs 42, 44 downwardly into the interior of the truck body. In FIG. 3 at 76 the lower opening of the cable passage in leg 44 can be seen.

The switch box 68 is substantially square-shaped and at the rear side has an elevation 78 which accommodates a rectangular button 80. In FIG. 3 holes 62, 68 on both sides of button 80 are arranged for a threaded connection of the switch box 68 and within recess 66 of housing 62.

Figure 2:
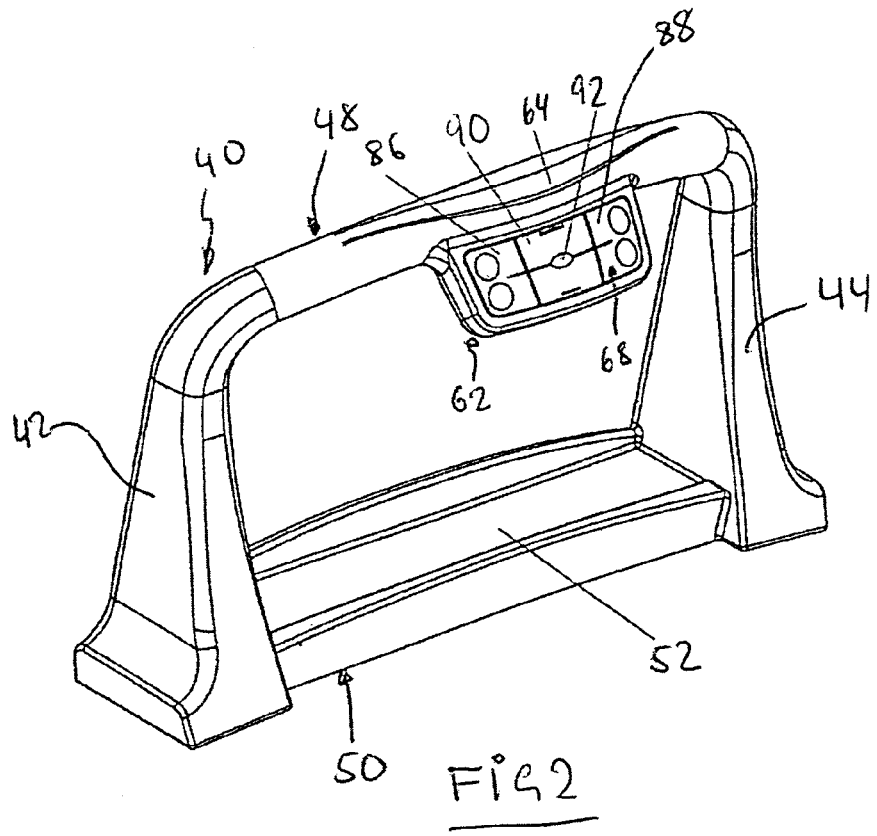
FIG. 2 shows perspectively the front view of a hand rail according to the invention.

As can be seen in FIG. 2, the switch box 68 has a control or a button panel with a left switch rocker 86, a right switch rocker 88 and an medium switch rocker 90. The switch rockers 86, 88, 90 are pivotably supported about a horizontal axis. They can be pushed downwards at the upper and the lower end in order to actuate a function of the truck not shown. In the centre area of switch rocker 90 a signal indicator 92 is shown. It can for example indicate a predetermined mode upon actuation of a function of the truck. The switches associated with the switch rockers 86 to 90 in switch box 68 can work in an analogous or digital manner. As can be seen, the actuation surfaces of the switch rockers 86 to 90 fill out the control panel of switch box 68 completely. It is of course conceivable to provide six control buttons instead of three rockers which are located by pairs one above the other so that three pairs of control buttons form the control panel of switch box 68.

Figure 4:
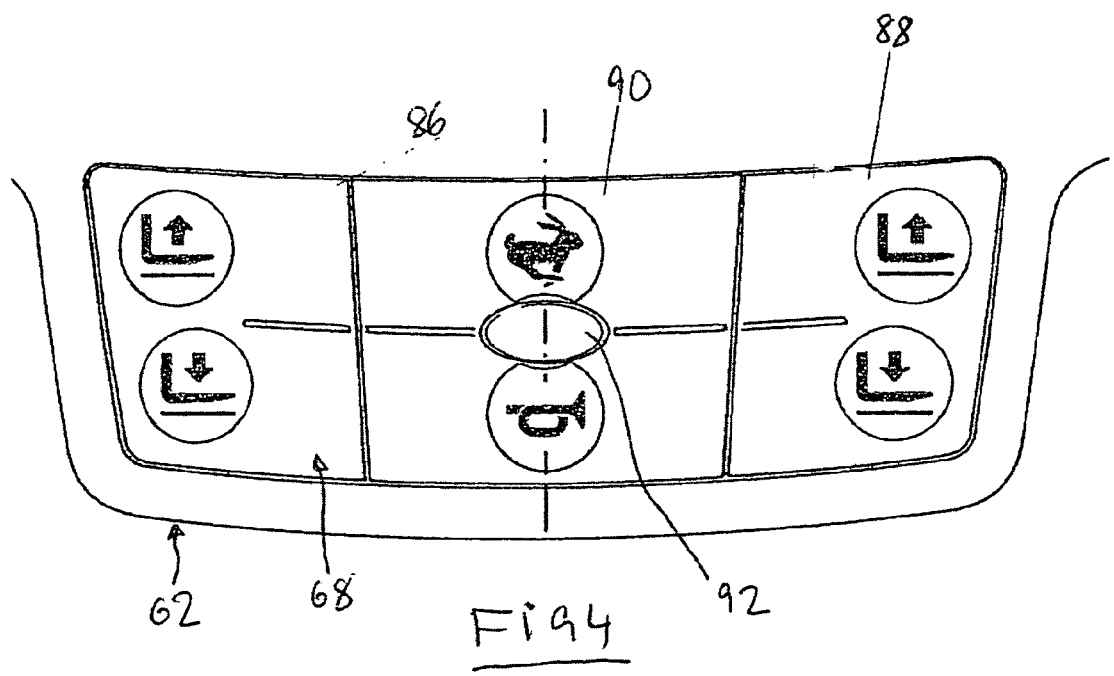
FIG. 4 shows enlarged the front control panel of a control housing of FIGS. 2 and 3.

In FIG. 4 the control panel of switch box 18 is shown in enlarged scale. It can be recognized from the symbols that the outer switch rockers 86, 88 are for the lifting and lowering of the load carrying fork. The switch rockers 86,88 can be mechanically or electrically coupled so that it is the same whether the left or the right switch rocker 86, 88 is actuated for the lifting or lowering function. Upon actuation of the upper part of the medium switch rocker 90 the fast speed mode is switched on while upon actuation of the lower part of switch rocker 90 the horn is activated.

Figure 5:
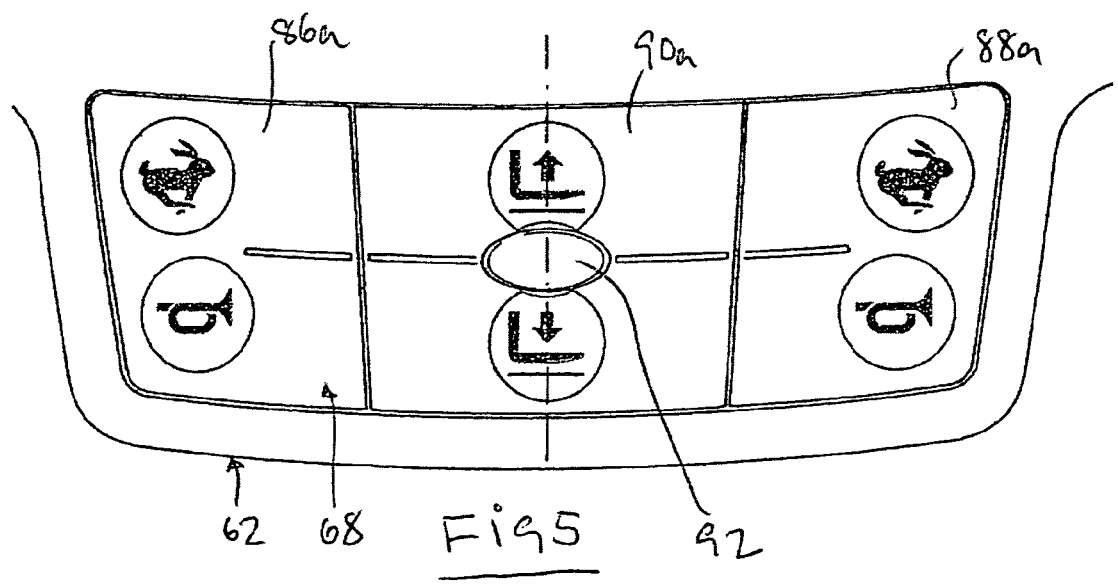
FIG. 5 shows an alternative embodiment of the control panel for the switch or control housing of FIGS. 1 and 2.

In the embodiment of FIG. 5 the arrangement of the switch rockers is changed relative to FIG. 4. The outer switch rockers 86a, 88a serve for the actuation of the fast speed mode and the horn as indicated by the symbols. The medium switch rocker 90a serves for the lifting and lowering of the load carrying fork as indicated by the symbols. The outer switch rockers 86a, 88a can be mechanically or electrically coupled.

Figure 6:
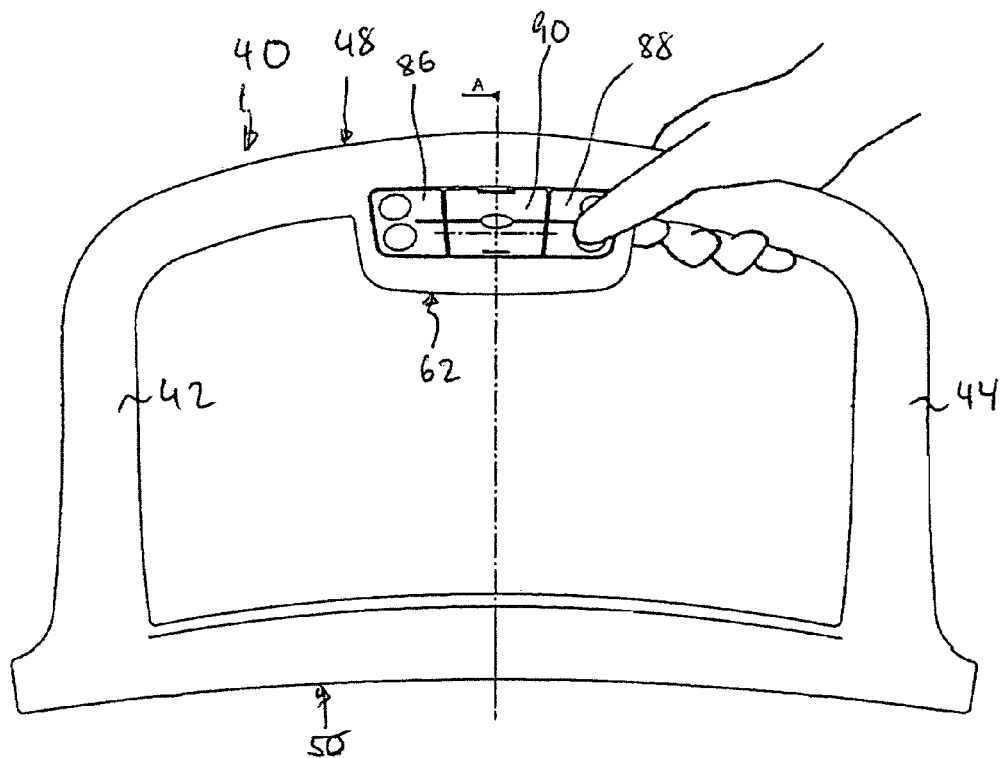
FIG. 6 shows the front view of the hand rail of FIG. 2 upon an actuation from the right side of the grab bar.
Figure 7:
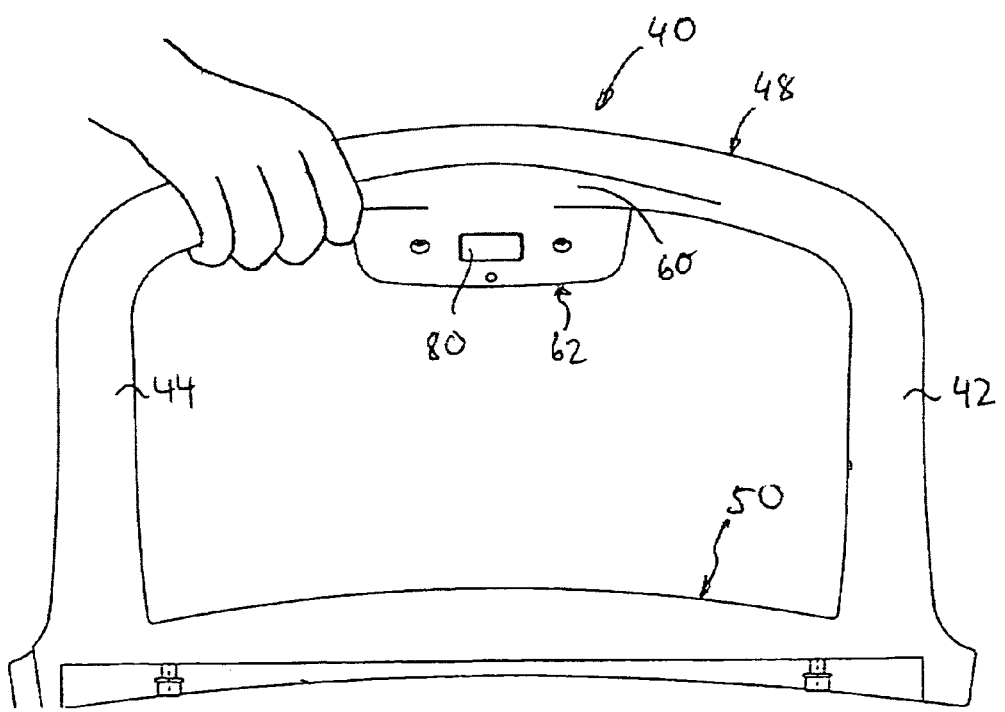
FIG. 7 shows the rear side of the illustration of FIG. 6.

In FIGS. 6 to 19 different gripping positions on the hand rail 40 or the gripping bar 48, respectively, are depicted. In the illustration of FIGS. 6 and 7 the hand seizes the right portion of grab bar 68 with the fingers of the hand approximately completely gripping around the grab bar 48 while the thumb actuates the right switch rocker 68. The index finger of the hand lies adjacent to control housing 62. As can be seen in FIGS. 3, 7, 11, 15 and 19 the bead 60 extends approximately beyond both sides of control housing 62 and changes over to the contour of the grab bar 68 circular in cross-section. The same is valid for the front bead 64 (see for example FIG. 2).

Figure 8:
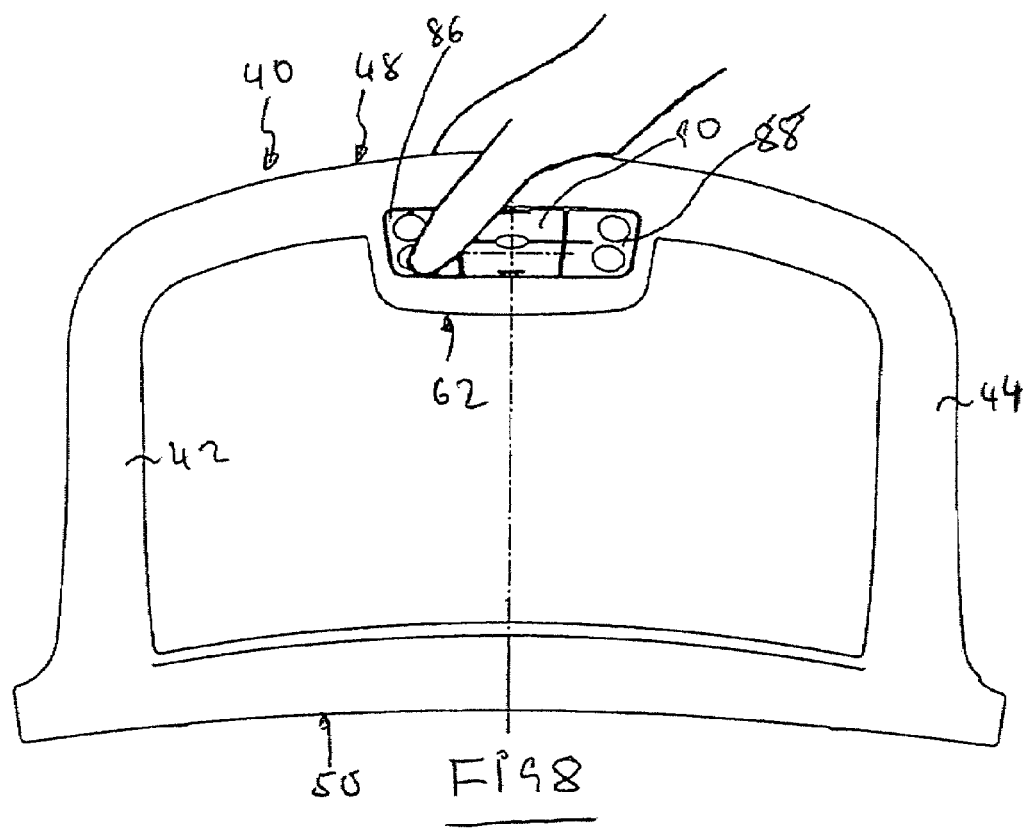
FIG. 8 shows the hand rail of FIGS. 2 and 3 a hand seizing the left side of the grab bar in the area of the switch box.
Figure 9:
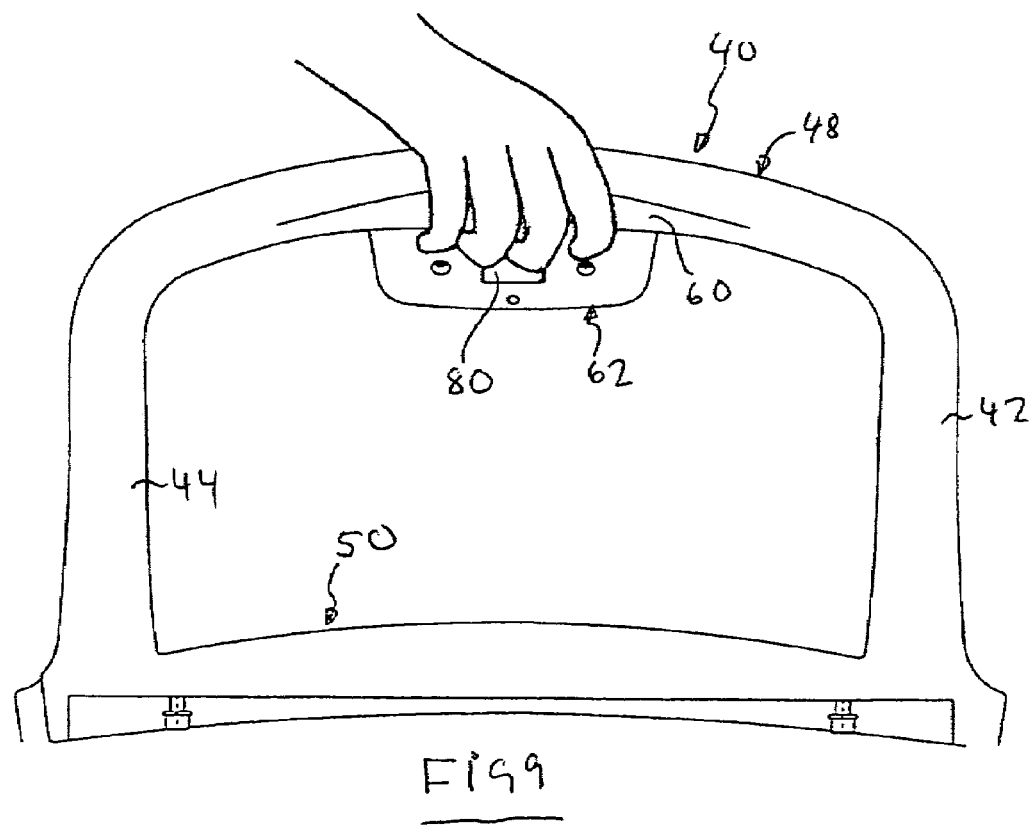
FIG. 9 shows the rear side of the hand rail of FIG. 8.
Figure 10:
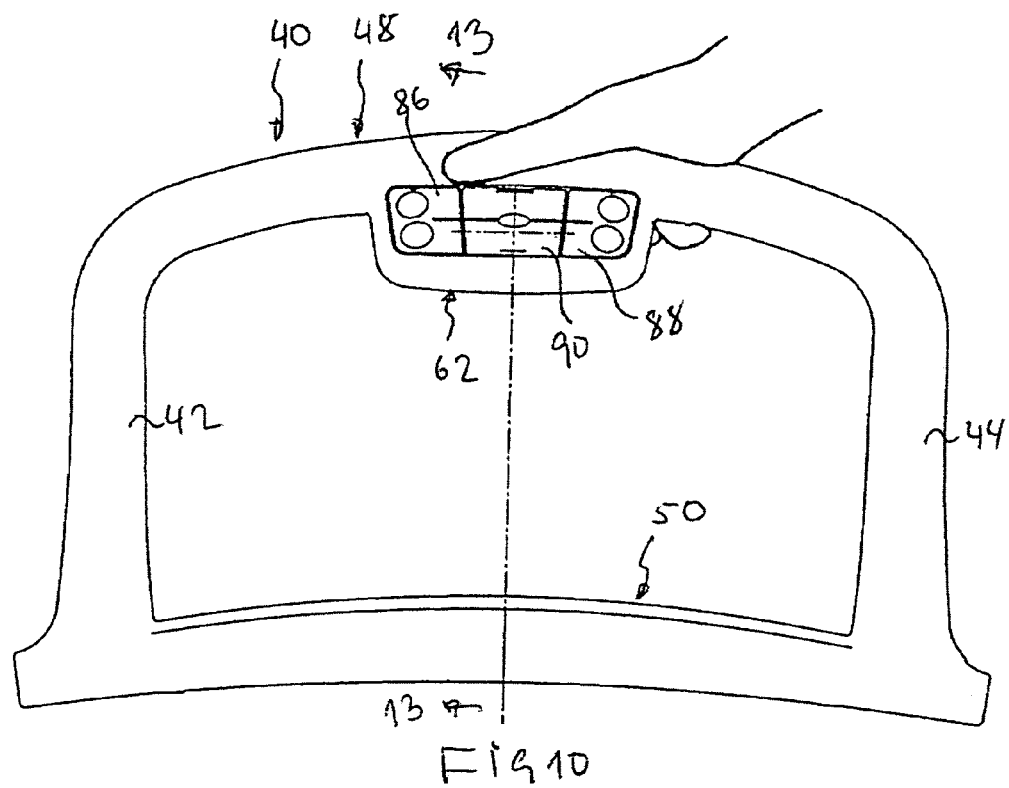
FIG. 10 shows the front side of the hand rail of FIG. 2, wherein the grab bar is seized by a hand in a central position.
Figure 11:
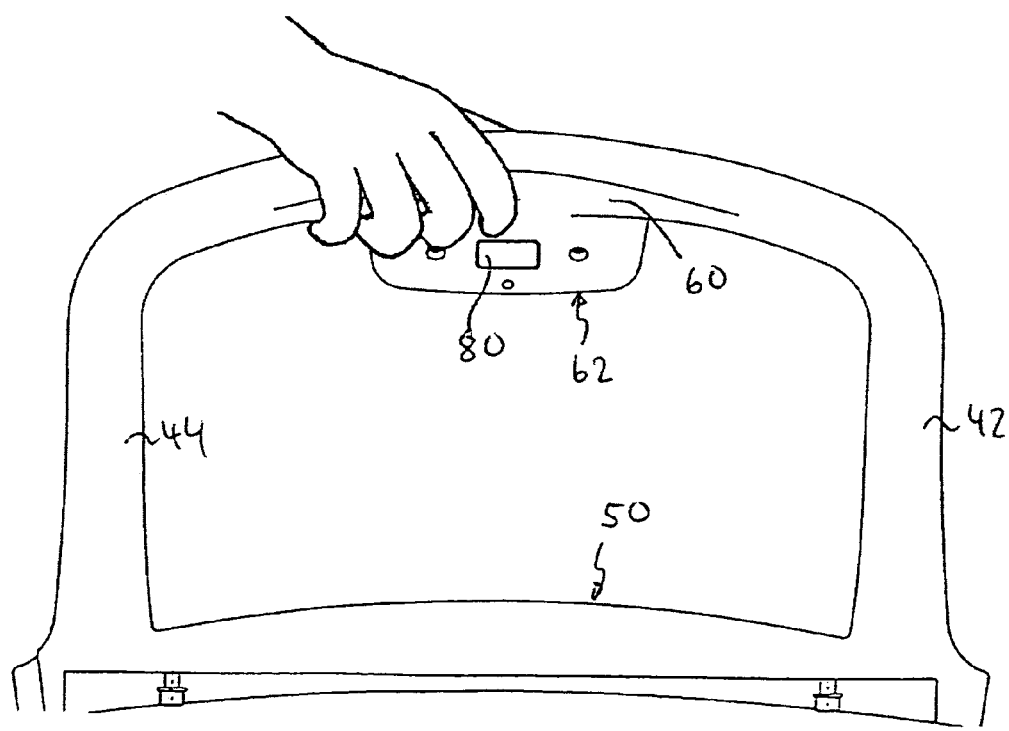
FIG. 11 shows the rear side of the hand rail of FIG. 10.

In the illustration of FIGS. 8 and 9 the right hand of the operator seizes the grab bar 48 in the area of control housing 62 with the fingers undergrip bead 60 and the thumb actuates the left switch rocker 86. In the illustration of FIGS. 10 and 11 the right hand of the operator seizes grab rod 48 approximately centrally without actuating a switch rocker. The thumb engages the front bead 64, and the fingers undergrip the rear bead 60.

Figure 14:
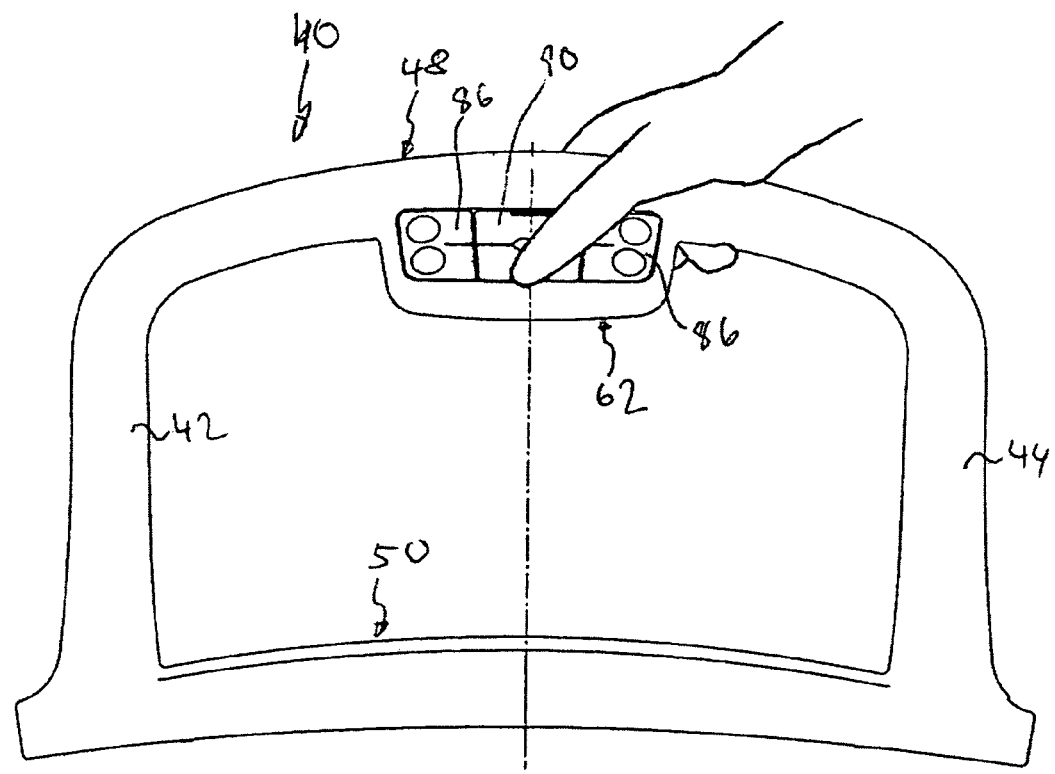
FIG. 14 shows the hand rail of FIG. 2 in a central gripping position of the hand upon actuation of the control panel.
Figure 15:
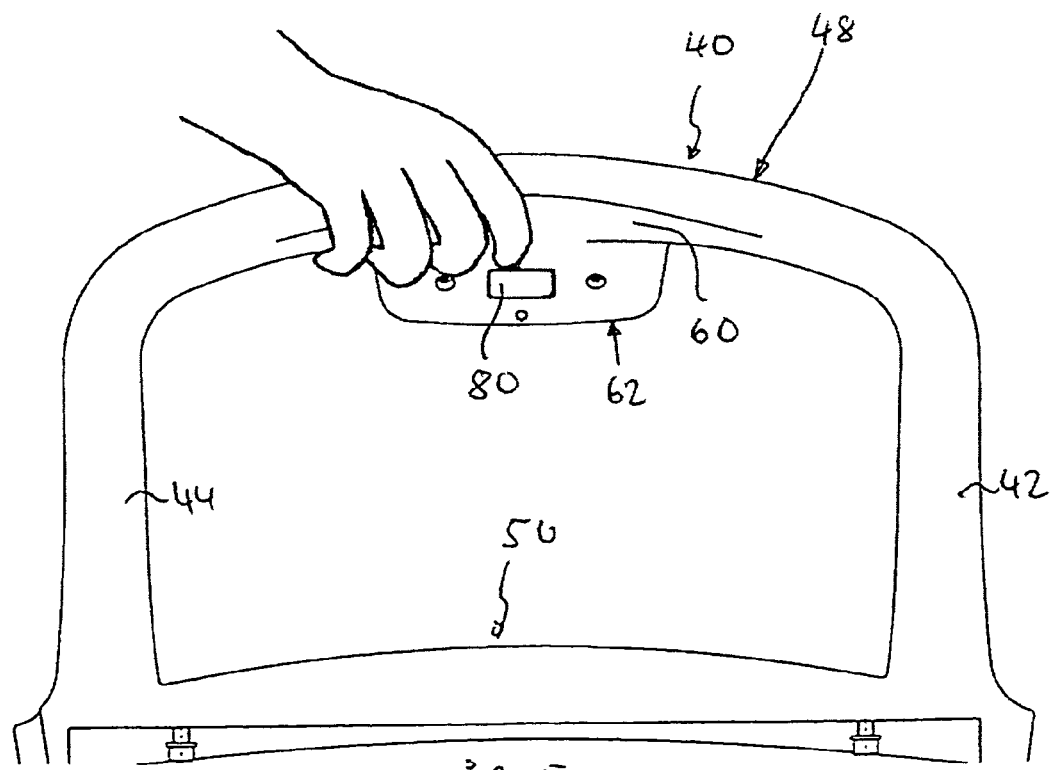
FIG. 15 shows the rear side of the hand rail of FIG. 14.

In the illustration of FIGS. 14 and 15 the right hand of the operator seizes the grab bar 48 approximately centrally with the thumb actuating the central switch rocker 90. The fingers undergrip bead 60 at the rear side.

Figure 16:
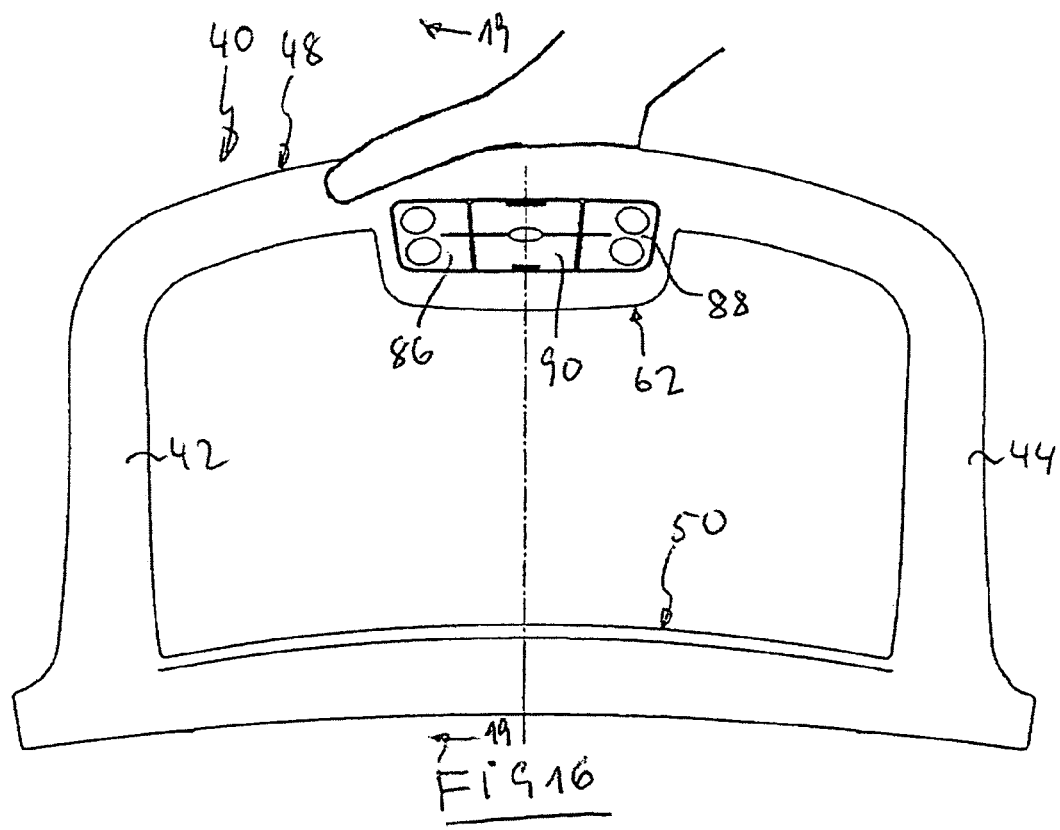
FIG. 16 shows the hand rail of FIG. 2 in a central gripping position of the hand upon actuation of a control element at the rear side of the control housing.
Figure 17:
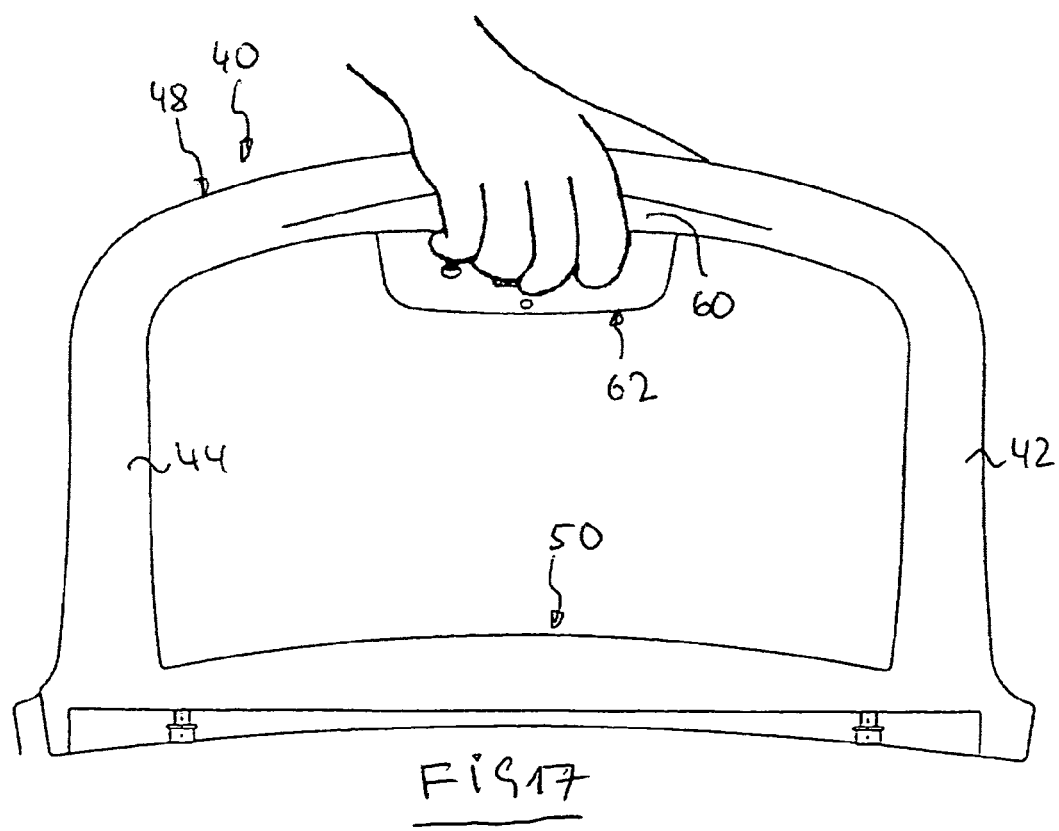
FIG. 17 shows the rear side of the hand rail of FIG. 17.

In the illustration of FIGS. 16 and 17 the right hand of the operator seizes the grab bar 48 approximately centrally with the thumb engaging the front side of grab bar 48 or the fingers undergrip bead 60 and one finger actuates the rear button 80. The gripping positions according FIGS. 10 and 11 can be also seen in FIGS. 12 and 13, and the gripping position of FIGS. 16 and 17 are again depicted in FIGS. 18 and 19.

From the figures it can be seen that the arrangement of the control housing 62 on the lower side of the grab bar 48 offers the possibility to seize the grab bar 48 on each position between its ends. If the grab bar is seized on both sides of control housing 62, the grab bar circular in cross-section is approximately completely spanned while seizing in an intermediate position the fingers may grip under bead 60 in order to achieve a sufficient support also in this position. Furthermore, in this gripping position the switch rockers 86 to 90 and button 80 may be actuated. It is not necessary that the operator releases grab bar 48 in order to perform a switch actuation.

The control housing is integrally formed with the plastic envelope of the hand rail 40 and allows a simple mounting of the switch box with a suitable control panel. The rear button 80 for example serves to actuate the coast mode. It is understood that also further control elements can be located at the rear side of the control housing 62. The signal indicator 92 is e.g. for the indication of the coast mode.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A hand rail for a walkie/rider truck comprising a lifting and lowering load carrying means and a body having a front and a rear end and an upper side, a stand platform for an operator being located at the front end of the body, and a steering arm being linked to the upper side of the body, the conversely U-shaped hand rail having two approximately parallel spaced vertical legs attached to the upper side of the body while a grab bar interconnects the upper ends of the legs, a control housing being mounted to the grab bar substantially in the centre thereof, the control panel including control elements for the lifting and lowering of the load carrying means, a horn and a fast speed mode, the entire control housing being positioned on the lower side of the grab bar and the grab bar being shaped such that the grab bar can be seized by the hand of the operator from above in the area of the control housing in order to obtain a support for and/or to actuate a control element by the operator, further wherein the box-shaped control housing extends obliquely downwardly and forwardly and the grip bar above the control housing has a bead-shaped thickening which extends rearwardly and which can be undergripped by the fingers of the hand seizing the grab bar, and further wherein the bead-shaped thickening is of plastic material and shaped or moulded to a tube of the grab bar and is integrally formed with the control housing, and the control housing at the front side has a recess for the accommodation of a switch box which includes the control elements.

2. The hand rail of claim 1, wherein the legs at the upper ends have a portion bent to the front end of the truck.

3. The hand rail of claim 1, wherein the legs and the grab bar are formed as a unit.

4. The hand rail of claim 3, wherein the legs at the lower end are interconnected by a transverse rail, and the rail is attached to the upper side of the truck body.

5. The hand rail of claim 4, wherein the transverse rail at the upper side has or forms an elongated cup.

6. The hand rail of claim 1, wherein the grab bar is convexly bent upwardly.

7. The hand rail of claim 1, wherein the control housing has a front control panel wherein the control elements for the lifting and lowering of the load carrying means are located at the left end and the right end of the panel and the control elements being electrically or mechanically coupled.

8. The hand rail of claim 7, wherein between the outer control elements for the lowering and the lifting control elements for a fast speed mode and a horn are arranged one above the other.

9. The hand rail of claim 1, wherein the control housing has a front control panel, and control elements for the lifting and lowering are arranged in the centre of the control panel one above the other, and at the end of the control panels, control elements for the fast speed mode and the horn are located one above the other, with the lateral control elements being mechanically or electrically coupled.

10. The hand rail of claim 7, wherein a signal indication means is approximately located in the centre of the control panel.

11. The hand rail of claim 1, wherein at least a further control element being provided on the rear side of the control housing.

12. The hand rail of claim 1, wherein the recess in the control housing has an aperture in the bottom thereof through which an elevation of the switch box is extended and the elevation includes at least a further control element.

13. The hand rail of claim 1, wherein opposite to the rear bead-shaped thickening a front bead-shaped thickening is provided which is less elevated than the rear bead-shaped thickening.

14. The hand rail of claim 13, wherein the rear and/or front bead-shaped thickening has approximately the same length as the control housing.

15. A hand rail for a walkie/rider truck comprising:
- a lifting and lowering load carrying means and a body having a front and a rear end and an upper side;
- a stand platform for an operator being located at the front end of the body, and a steering arm being linked to the upper side of the body;
- the conversely U-shaped hand rail having two approximately parallel spaced vertical legs attached to the upper side of the body while a grab bar interconnects the upper ends of the legs;
- a control housing being mounted to the grab bar substantially in the centre thereof,
- the control panel including control elements for the lifting and lowering of the load carrying means;
- a horn and a fast speed mode, the entire control housing being positioned on the lower side of the grab bar and the grab bar being shaped such that the grab bar can be seized by the hand of the operator from above in the area of the control housing in order to obtain a support for and/or to actuate a control element by the operator;
- wherein the box-shaped control housing extends obliquely downwardly and forwardly and the grip bar above the control housing has a bead-shaped thickening which extends rearwardly and which can be undergripped by the fingers of the hand seizing the grab bar, and
- wherein the bead-shaped thickening is of plastic material and shaped or moulded to a tube of the grab bar and is integrally formed with the control housing, and the control housing at the front side has a recess for the accommodation of a switch box which includes the control elements.

* * * * *